United States Patent
Yamada

(10) Patent No.: US 7,126,895 B2
(45) Date of Patent: Oct. 24, 2006

(54) OPTICAL DISK RECORDER OPTIMIZING LASER POWER FOR INITIAL WRITING AND OVERWRITING

(75) Inventor: Seiya Yamada, Shimada (JP)

(73) Assignee: Yamaha Corporation, Hamamatsu (JP)

( * ) Notice: Subject to any disclaimer, the term of this patent is extended or adjusted under 35 U.S.C. 154(b) by 456 days.

(21) Appl. No.: 10/125,099

(22) Filed: Apr. 18, 2002

(65) Prior Publication Data

US 2002/0154587 A1    Oct. 24, 2002

(30) Foreign Application Priority Data

Apr. 19, 2001    (JP)    ............... 2001-121657

(51) Int. Cl.
*G11B 7/125*    (2006.01)
(52) U.S. Cl. ................... 369/47.53; 369/53.24
(58) Field of Classification Search ............ 369/47.51, 369/47.53, 59.11, 53.11, 53.24
See application file for complete search history.

(56) References Cited

U.S. PATENT DOCUMENTS

| | | | |
|---|---|---|---|
| 5,144,601 A * | 9/1992 | Maeda et al. ............ | 369/13.25 |
| 5,381,396 A * | 1/1995 | Tanaka et al. ............ | 369/116 |
| 5,453,971 A * | 9/1995 | Syo et al. ............... | 369/53.24 |
| 5,602,806 A * | 2/1997 | Arnett et al. ............ | 369/13.24 |
| 5,841,747 A * | 11/1998 | Kubota et al. ........... | 369/47.52 |
| 5,848,043 A * | 12/1998 | Takada et al. ............ | 369/53.3 |
| 6,052,346 A * | 4/2000 | Arataki et al. ........... | 369/47.54 |
| 2001/0007548 A1 * | 7/2001 | Toda et al. .............. | 369/53.27 |

FOREIGN PATENT DOCUMENTS

| | | |
|---|---|---|
| JP | 2000-113456 | 4/2000 |
| JP | 2000-207742 | 7/2000 |

OTHER PUBLICATIONS

Hiroyuki Yuzuriha, Notice of Rejection, Office Action, Japanese Patent Office (Japan), pp. all, (Jan. 11, 2005).

* cited by examiner

*Primary Examiner*—Andrea Wellington
*Assistant Examiner*—Lixi Chow
(74) *Attorney, Agent, or Firm*—Pillsbury Winthrop Shaw Pittman LLP

(57) ABSTRACT

A method is designed for recording data on a recordable area of an optical disk by irradiating thereto an optical beam having a writing power effective to write the data in the recordable area including a non-recorded area which is blank and a recorded area which is recorded with old data. The method is performed by the step of performing either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data, and the step of controlling to change the writing power of the optical beam between the initial writing operation and the overwriting operation so as to secure the recording of the new data in both of the initial writing operation and the overwriting operation.

7 Claims, 7 Drawing Sheets

| | ρ VALUE |
|---|---|
| INITIAL WRITING | α |
| DOW | α × κ |

| DOW | $\rho$ VALUE |
|---|---|
| 0 | $\alpha$ |
| 1~10 | $\alpha \times \kappa$ |
| 11~999 | $\alpha \times \kappa'$ |
| 1000 OR GREATER | $\alpha \times \kappa''$ |

OPTICAL DISK RECORDER OPTIMIZING LASER POWER FOR INITIAL WRITING AND OVERWRITING

BACKGROUND OF THE INVENTION

The present invention relates to an optical disk recording method and apparatus for recording information on an overwritable optical disk, such as CD-RW, DVD-RAM or DVD-RW, and more particularly relates to a method and apparatus for optical disk recording by a proper writing power at either of the time of initial writing and the time of overwriting.

To compensate for a peculiarity of a disk medium, characteristics of a laser diode (LD) and variations in an optical power of LD, and to perform recording with the optimum optical power, an optical disk recording apparatus executes OPC (Optimum Power Control) to acquire the optimum power for the medium beforehand. CD-RW uses a γ method as OPC. That is, test writing of test data is carried out while changing a writing power of an LD step by step at a predetermined recording speed (linear velocity) by using a PCA (Power Calibration Area) located typically in the innermost track of an optical disk. Upon reproduction of the test data, if a reproduction signal (EFM signal) has a waveform as shown in FIG. 9, a modulation degree (Modulation) m11 is determined from the following equation 1:

$$m11 = I11/Itop \quad [\text{Eq. 1}]$$

Here, Itop denotes an amplitude to a peak value P from an EFM reference level, and I11 denotes an amplitude equivalent to a difference between the peak value P and a bottom value B. The modulation degree m11 is acquired with each writing power and its normalized slope γ is determined from the following equation 2:

$$\gamma = (dm11/dP)/(m11/P) \quad [\text{Eq. 2}]$$

The determined m11 and γ may have characteristics as shown in FIG. 10. As the writing power increases, m11 increases gradually and γ decreases gradually. Provided that the writing power at which a γ target is obtained is a Ptarget, optimal writing power Po is determined from the following equation 3:

$$Po = Ptarget \times \rho \quad [\text{Eq. 3}]$$

Here, the parameter ρ is used to calculate the optimal writing power Po from the Ptarget. The optimal writing power Po can minimize jittering at the time of initial writing. Such a value of the parameter ρ only exists one for each medium and each recording speed.

With respect to CD-RW, however, there may be a case where an overwriting characteristic is present and the optimal writing power which has been determined by the γ method should not necessarily be the optimal value for minimizing of the jitter indicative of recording quality. It is seen from FIG. 10 that the writing power at a bottom point of the jitter at the time of initial writing indicated by a broken line obviously shifts from another bottom point of the jitter at the time of DOW1 (Direct Over Write Once) indicated by a dot-dash line. In this case, it can be said that executing OPC makes the recording quality rather poor, and causes a recording quality detarioration that should not be ignored.

SUMMARY OF THE INVENTION

This invention has been made in consideration of such a view point, and aims at providing an optical disk recording method and apparatus which can perform recording with the optimal writing power even at the time of overwriting.

A first optical disk recording method according to this invention is designed for recording data on a recordable area of an optical disk by irradiating thereto an optical beam having a writing power effective to write the data in the recordable area including a non-recorded area which is blank and a recorded area which is recorded with old data. The method comprises the steps of performing either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data, and controlling to change the writing power of the optical beam between the initial writing operation and the overwriting operation so as to secure the recording of the new data in both of the initial writing operation and the overwriting operation.

A second optical disk recording method according to this invention is designed for recording data on a recordable area of an optical disk by irradiating thereto an optical beam having a writing power effective to write the data in the recordable area including a non-recorded area which is blank and a recorded area which is recorded with old data. The method comprises the steps of performing a trial writing operation such as to irradiate the optical beam onto a predetermined area of the optical disk for test recording of data to determine an optimal writing power of the optical beam, performing either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data, and controlling an actual writing power of the optical beam based on the determined optimal writing power in a different manner between the initial writing operation and the overwriting operation so as to secure the recording of the new data in either of the initial writing operation and the overwriting operation.

An optical disk recording apparatus according to the invention is designed for recording data on an optical disk by an optical beam. The apparatus comprises a spindle motor that is provided for rotating the optical disk having a recordable area including a non-recorded area where data is not yet recorded and a recorded area where old data is already recorded, an optical pickup that is provided to irradiate the rotated optical disk with the optical beam having a writing power effective to write the data in the recordable area, and a controller that controls the spindle motor and the optical pickup to control the recording of data. The controller comprises a trial section that performs a trial writing operation such as to irradiate the optical beam onto a predetermined area of the optical disk for test recording of data to determine an optimal writing power of the optical beam, a selecting section that selects either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data, and a setting section that sets an actual writing power of the optical beam based on the determined optimal writing power for the overwriting operation greater than another actual writing power of the optical beam for the initial writing operation so as to secure the recording of the new data in either of the initial writing operation and the overwriting operation.

According to this invention, the writing power is changed between the time of initial writing in an non-recorded area of an overwritable optical disk and the time of overwriting in a recorded area, so that even in the presence of an overwriting characteristic, recording with the optimal writing power suitable for the recording state becomes possible and the best recording quality can always be achieved.

According to one mode of the invention, the inventive method further comprises the steps of scanning the recordable area of the optical disk prior to the recording of data by irradiating the optical beam so as to reproduce a signal from the recordable area, and discriminating the non-recorded area and the recorded area according to the reproduced signal throughout the recordable area. According to another mode, the inventive method further comprises the steps of detecting the optical beam reflected back from the optical disk during the course of recording data on the recordable area, and discriminating the non-recorded area and the recorded area according to the detected optical beam.

According to still another mode, the inventive method further comprises the steps of memorizing locations of the non-recorded area and the recorded area throughout the recordable area, and further memorizing a number of the overwriting operations applied to the recorded area. In such a case, the step of controlling may adjust the actual writing power of the optical beam irradiated to the recorded area according to the memorized number of the overwriting operations applied to the recorded area. The recording quality can be improved by such a fine control on the writing power. It is desirable that the step of controlling sets the actual writing power for the overwriting operation greater than the actual writing power for the initial writing operation.

DETAILED DESCRIPTION OF THE INVENTION

Figure 1:
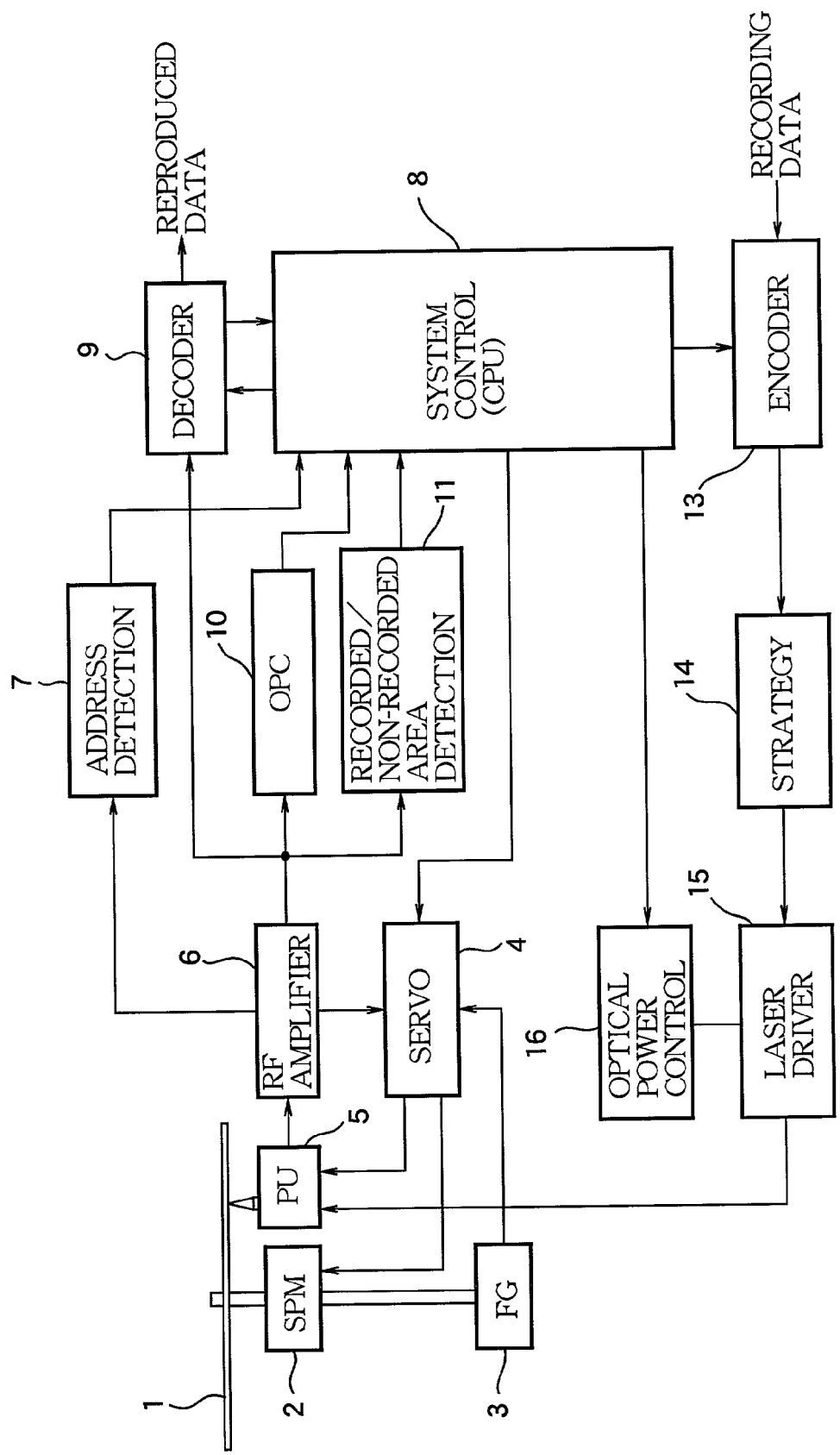
FIG. 1 is a block diagram showing the structure of an optical disk recording apparatus according to the first embodiment of the invention.

Preferred embodiments of the invention will now be described with reference to the accompanying drawings. FIG. 1 is a block diagram showing the structure of the essential portion of an optical disk recording apparatus according to a first embodiment of the invention.

An optical disk 1 is of an overwritable type such as CD-RW, and has a spiral track in a one-stroke drawn form from the innermost periphery of a recording area to the outermost periphery. In this structure, a linear recording density control signal for defining the recording linear density of data is superimposed at a constant linear density along the track. This linear recording density control signal is a wobble (Wobble) including an ATIP (Absolute Time In Pregroove) which is absolute time information in this example. The optical disk 1 is driven to rotate by a spindle motor (SPM) 2. Connected to its rotary shaft is a frequency generator (FG) 3 comprised of a Hall element or the like, and an FG pulse to be output from the frequency generator 3 is input to a servo circuit 4.

In a case where the optical disk 1 is subjected to CAV control, the servo circuit 4 controls the rotation of the spindle motor 2 in such a way that the FG pulse will be synchronized with a reference clock. Accordingly, the rotation of the optical disk 1 is controlled at a constant rotational speed. In a case where the optical disk 1 is subjected to CLV control, the servo circuit 4 controls the rotation of the spindle motor 2 in such a way that a wobble signal, which has been read out from the optical disk 1 via an optical pickup 5 and amplified by an RF amplifier 6, will be synchronized with the reference clock. Accordingly, the rotation of the optical disk 1 is controlled at a constant linear velocity.

The wobble signal output from the RF amplifier 6 is supplied to an address detection circuit 7 where an ATIP time code and an ATIP clock are extracted and an address on the optical disk is detected. The detected address is supplied to a system control part (CPU) 8. The system control part 8 identifies a recording position in the radial direction of the optical disk 1 from the input address, and sends the servo circuit 4 a reference clock which has been varied based on the recording position.

The output of the RF amplifier 6 or a reproduction signal is input to a decoder 9 where the output is subjected to EFM (Eight to Fourteen Modulation) modulation and CIRC (Cross Interleaved Reed-Solomon Code) coding, thereby providing reproduced data, while a CI error originated from the decoding and a SYNCEQ (sync signal) are detected and supplied to the system control part 8. Further, the reproduction signal output from the RF amplifier 6 is supplied to an OPC circuit 10 as optimal writing power determining means and a recorded/non-recorded area detection circuit 11, respectively.

In the OPC circuit 10, at the time of executing OPC, an amplitude Itop measured from a reference level of the reproduction signal to a peak value and an amplitude I11 of a difference between the peak value and a bottom value are sampled and held by carrying out test writing for each writing power, so that a modulation degree m11 and a slope γ are computed based on the amplitudes, and optimal writing power Po is computed based on a parameter ρ which is determined by the optical disk 1 and the recording speed. Prior to recording on the optical disk 1, a recorded/non-recorded area detection circuit 11 scans the optical disk 1 and discriminates between non-recorded and recorded areas all over recordable program areas of the optical disk 1.

Meanwhile, data to be recorded is input to an encoder 13 which performs CIRC/EFM encoding on the recording data in accordance with an EFM clock fed from the system control part 8. A write strategy circuit 14 generates a recording pulse suitable for recording from the encoded recording data. The recording pulse is supplied to a laser driver 15. The system control part 8 controls the laser driver 15 via an optical power control part 16 based on the optimal writing power that is determined by a method to be discussed later. Accordingly, the optical pickup 5 irradiates a laser beam with the optimized power, forming recording pits on the optical disk 1 with the linear density based on the EFM clock. A dedicated computer program may be installed in the disk drive apparatus having the system control part 8 for recording data on the recordable area of the optical disk 1 by irradiating thereto an optical beam having a writing power effective to write the data in the recordable area including a non-recorded area which is blank and a recorded area which is recorded with old data. The dedicated program is executable by the system control part 8 for causing the disk drive apparatus to perform the inventive process comprising basically the steps of performing either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data, and controlling to change the writing power of the optical beam between the initial writing operation and the overwriting operation so as to secure the recording of the new data in both of the initial writing operation and the overwriting operation.

Figure 9:
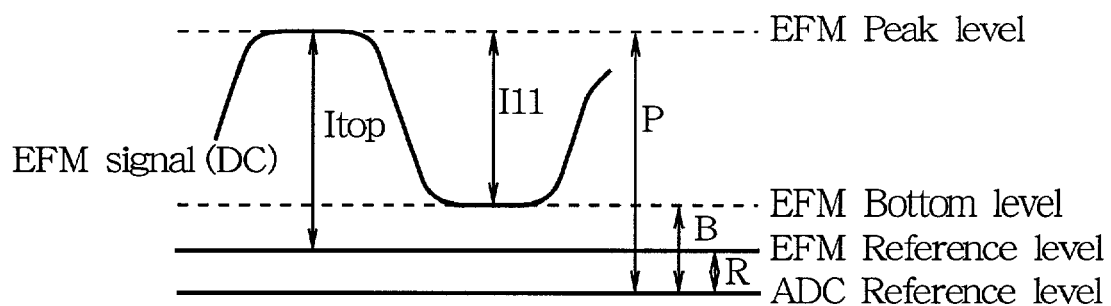
FIG. 9 is a waveform diagram of a reproduction signal in OPC.
Figure 10:
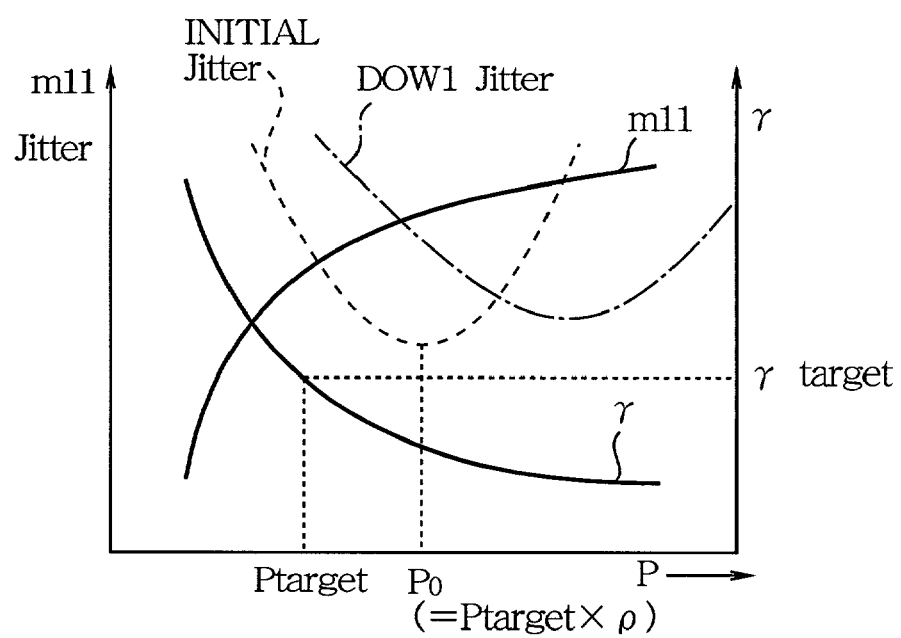
FIG. 10 is a graph showing the relationship among a modulation degree, slope and jitter with respect to a writing power.

A description will now be given of the recording operation of the optical disk recording apparatus thus constituted. The OPC operation of the OPC circuit 10 is to perform test writing of a test pattern while changing the writing power of the optical pickup 5 in a stepwise manner frame by frame over, for example, fifteen frames at a predetermined recording speed in PCA formed in the innermost peripheral area of the optical disk prior to the actual recording operation. Then, the test-written portion is reproduced, and a peak value P and a bottom value B of a reproduction signal (EFM signal) as shown in FIG. 9 are detected at the OPC circuit 10. The overwriting characteristic (hereinafter called DOW characteristic) is determined by the drive (optical pickup 5) side and the type of the optical disk 1, and the $\rho$ value for setting the writing power at which jitter becomes the least is uniquely determined. Here, the optimal writing power Po is calculated by multiplying Ptarget equivalent to $\gamma$ target by $\rho$.

Meanwhile, when the optical disk 1 is loaded into the apparatus, the system control part 8 drives the spindle motor 2 and the optical pickup 5 to detect reproduction signals all over the program areas of the optical disk 1, detects the start position and end position of an non-recorded area and the start position and end position of a recorded area while monitoring the output of the decoder 9, and internally stores the decoder outputs of these positions. To shorten the search time, it would be better to combine a rough search (S1) and a detailed fine search (S2), as shown in FIG. 2.

Figures 2, 3:
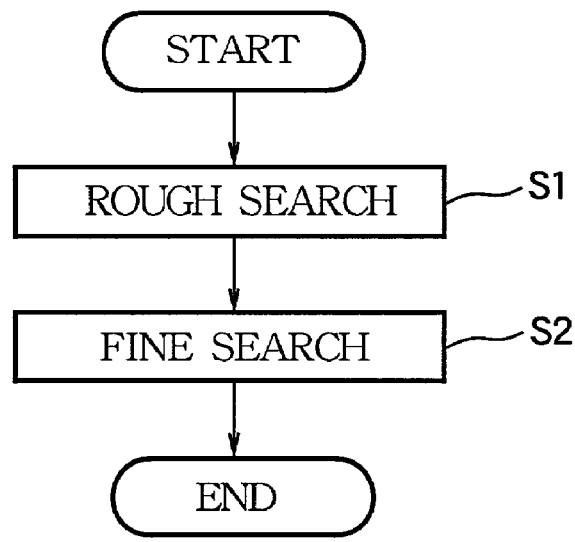
FIG. 2 is a flowchart illustrating a recorded area/non-recorded area search process in the inventive apparatus.
FIG. 3 is a table showing the relationship between recording numbers and ρ values in the apparatus.

At the time of actual recording, it is determined whether an address to be recorded is an address in an non-recorded area or an address in a recorded area, and the $\rho$ value is changed accordingly as shown in FIG. 3. Specifically, in the former case, it is the initial writing so that the $\rho$ value is set to $\alpha$ whereas in the latter case, it is overwriting with respect to a recorded area (DOW) so that the $\rho$ value is set to $\alpha \times \kappa$. Here, $\kappa$=about 1.1, for example. This embodiment is effective in write-once recording, such as track-at-once recording.

Figure 4:
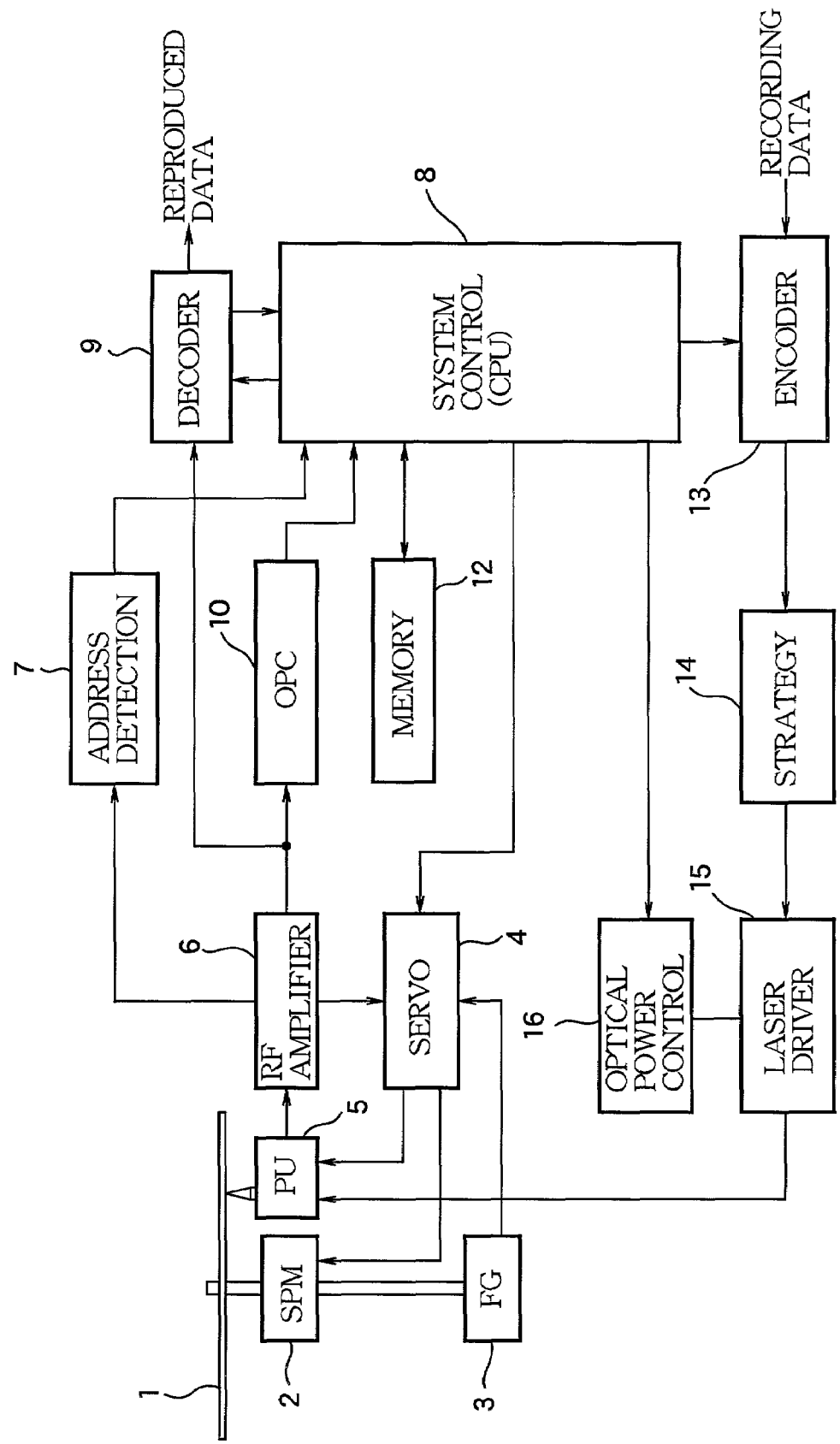
FIG. 4 is a block diagram showing the structure of an optical disk recording apparatus according to the second embodiment of the invention.

FIG. 4 is a block diagram showing the structure of the essential portion of an optical disk recording apparatus according to a second embodiment of the invention. Same reference symbols are given to those portions in FIG. 4 which are the same as the corresponding portions in FIG. 1, and redundant description on these portions will be omitted.

Figures 5, 6:
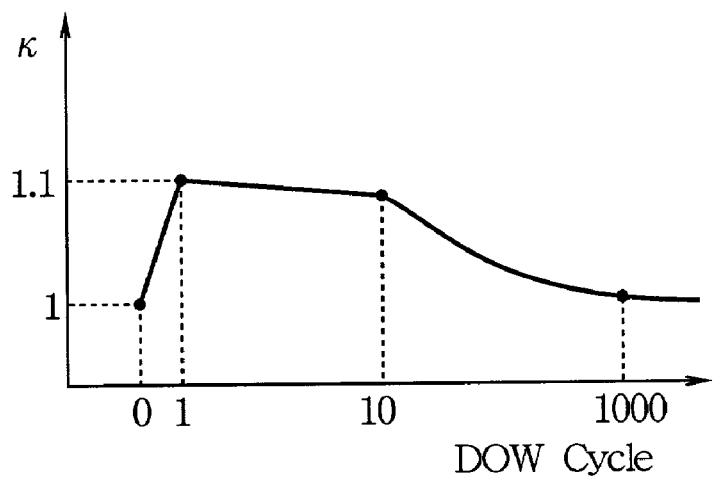
FIG. 5 is a graph showing the relationship between overwrite numbers and κ values.
FIG. 6 is a table showing the relationship between recording numbers and ρ values in the inventive apparatus.

In this embodiment, a memory 12 is newly provided in place of the recorded/non-recorded area detection circuit 11 in FIG. 1. That is, while only the discrimination of an non-recorded area and a recorded area is done in the preceding embodiment, a recording operation time index (recording position) and the number of DOW times are stored in the memory 12 in this embodiment. That is, for a CD-RW, the optimal value of $\kappa$ changes depending on the number of DOW times as shown in FIG. 5. For example, while $\kappa$=0 at the time of initial writing, the value of $\kappa$ changes in such a way that $\kappa$=1.1 at DOW 1, and $\kappa$ gradually decreases thereafter until DOW 10, and approaches to $\kappa$=1 at DOW 1000. In a case where packet writing such as done for a floppy disk is performed on a CD-RW, the recording operation with respect to the optical disk 1 becomes at random. At the time when the recording actually takes place, therefore, the position of the target area and the number of recording times are stored in the memory 12, so that it can be known at the next recording time the number of DOW applied to the area. The system control part 8 should pre-store a table showing the relationship between the DOW numbers and $\rho$ values as shown in FIG. 6 so that the writing power of OPC will be calculated from the $\rho$ value according to the DOW number. This can ensure optimal recording at the time of packet writing. The embodiment is particularly effective at the time of overwriting the header portion where address information is frequently rewritten.

It is to be noted that the embodiment is premised on the use of the same optical disk 1 in the same drive. However, even when the optical disk 1 is replaced with another one, if data on the recording position and the DOW number are stored in pairs with identification information of the optical disk 1, data recorded in the past can be used using the identification information read out from the optical disk 1. Further, if the recording position and the DOW number are stored in a predetermined area of the optical disk 1, not in the memory 12, any drive can use the data and perform the optimal recording on the optical disk.

Figure 7:
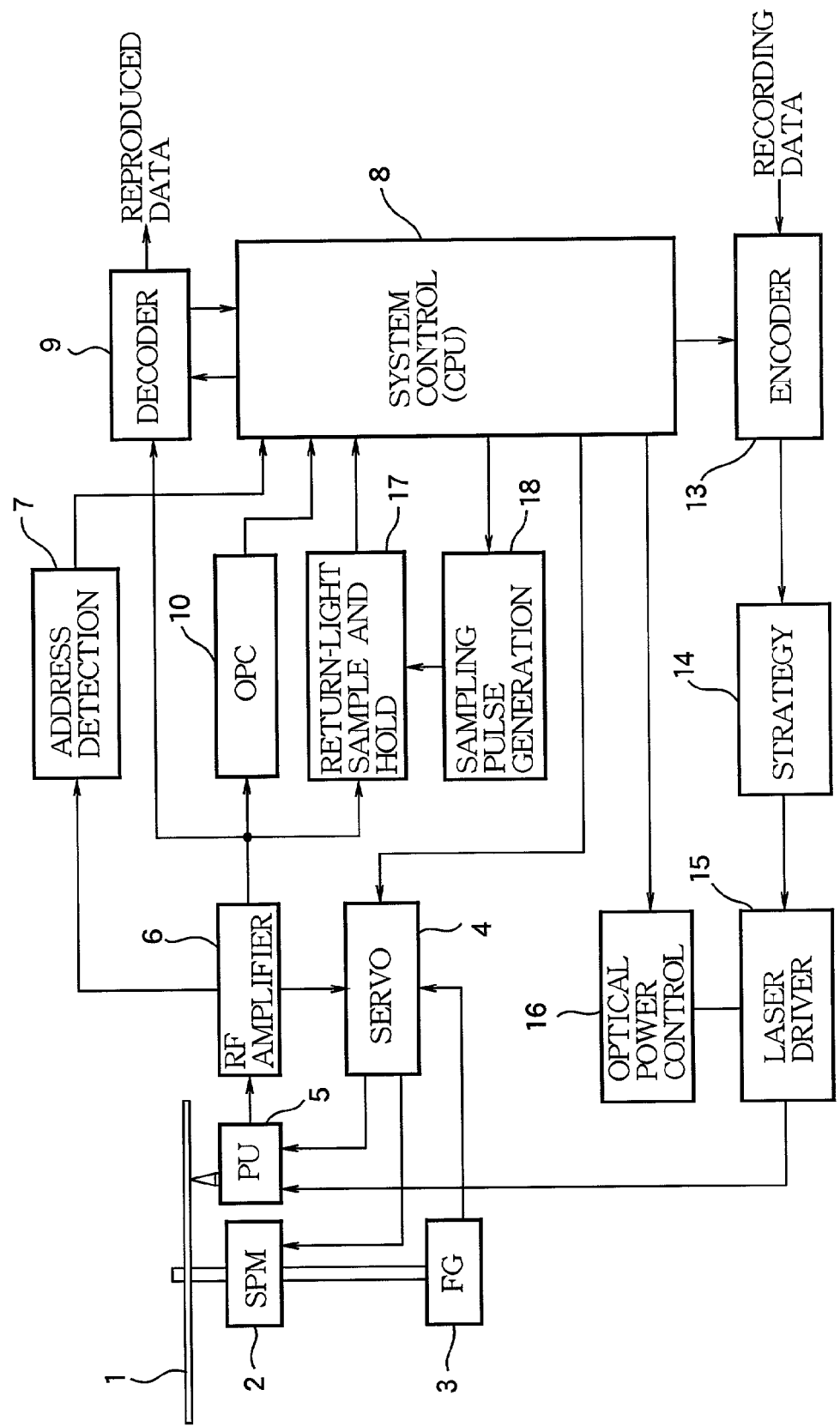
FIG. 7 is a block diagram showing the structure of an optical disk recording apparatus according to the third embodiment of the invention.

FIG. 7 is a block diagram showing the structure of the essential portion of an optical disk recording apparatus according to a third embodiment of the invention. Same reference symbols are given to those portions in FIG. 7 which are the same as the corresponding portions in FIG. 1, and redundant description on these portions will be omitted.

This embodiment is to perform discrimination of initial writing and overwriting during the recording operation. Namely, the embodiment is to detect the recording state by detection means and determine a $\rho$ value while executing the recording operation so that the writing power will be optimized.

The output of return light which is reflected back to the optical pickup 5 from the optical disk 1 during the recording operation is input to a return-light sample and hold circuit 17 and is sampled and held in accordance with a sampling pulse output from a sampling pulse generating circuit 18.

Figure 8:
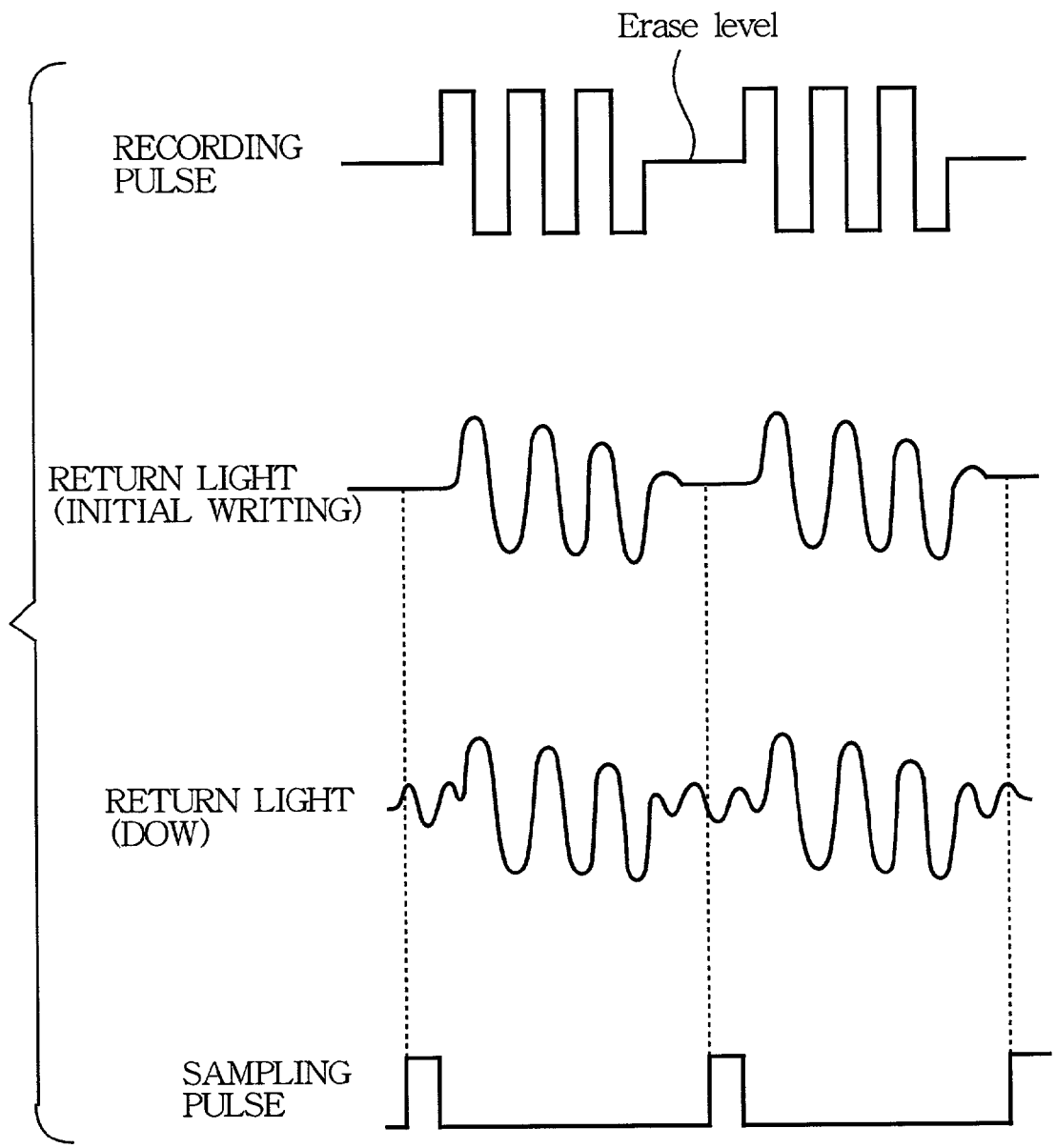
FIG. 8 is a waveform diagram showing the relationship between a recording pulse and return light observed in the inventive apparatus.

FIG. 8 shows the relationship between a recording pulse and return light. The recording pulse is a multi-pulsed signal and keeps an erase level during other than the recording period. Because recording pits have not been formed on the optical disk 1 at the time of initial writing, the level of return light in the erase period is stable. At the time of overwriting, however, old recording pits remain on the track, so that the level of return light in the erase period becomes instable. In this respect, the sampling pulse generating circuit 18 outputs a sampling pulse during the erase period of the return light. Therefore, it is detected the initial writing when the level of return light sampled and held in the return-light sample and hold circuit 17 is stable, and the overwriting is detected in case the instability is observed, so that the writing power is optimized by changing the ρ value accordingly.

According to the embodiment, it is a system which always monitors the recording state at a recording position during a recording operation, so that it can cope with any optical disk and is adaptable to TOC recording too.

As described above, the invention demonstrates an advantage such that the writing power is changed between the time of initial writing in an non-recorded area of an overwritable optical disk and the time of overwriting in a recorded area, so that even in the presence of an overwriting characteristic, recording with the optimal writing power suitable for the recording state becomes possible and the best recording quality can always be achieved.

What is claimed is:

1. A method of recording data on a recordable program area of an optical disk by irradiating thereto an optical beam having a writing power effective to write the data in the recordable program area including a non-recorded area which is blank and a recorded area which is recorded with old data, the method comprising:

scanning the recordable program area of the optical disk prior to an actual recording operation of recording new data prior to the recording of data by irradiating the optical beam so as to reproduce a signal from the recordable program area, and discriminating between the non-recorded area and the recorded area according to the reproduced signal throughout the recordable program area;

performing either of an initial writing operation or an overwriting operation as the actual recording operation of recording new data on the recordable program area of the optical disk, the initial writing operation irradiating the optical beam onto the non-recorded area to initially write the new data, the overwriting operation irradiating the optical beam onto the recorded area to write the new data over the old data; and controlling the writing power of the optical beam between the initial writing operation and the overwriting operation so as to secure the recording of the new data in both the initial writing operation and the overwriting operation.

2. A method of recording data on a recordable program area of an optical disk by irradiating thereto an optical beam having a writing power effective to write the data in the recordable program area including a non-recorded area which is blank and a recorded area which is recorded with old data, the method comprising:

performing either of an initial writing operation or an overwriting operation as an actual recording operation of recording new data on the recordable program area of the optical disk, the initial writing operation irradiating the optical beam onto the non-recorded area to initially write the new data, the overwriting operation irradiating the optical beam onto the recorded area to write the new data over the old data; and controlling the writing power of the optical beam between the initial writing operation and the overwriting operation so as to secure the recording of the new data in both the initial writing operation and the overwriting operation, wherein controlling the writing power sets the writing power for the overwriting operation greater than the writing power for the initial writing operation.

3. A method of recording data on a recordable program area of an optical disk by irradiating thereto an optical beam having a writing power effective to write the data in the recordable program area including a non-recorded area which is blank and a recorded area which is recorded with old data, the method comprising:

scanning the recordable program area of the optical disk prior to an actual recording operation of recording new data by irradiating the optical beam so as to reproduce a signal from the recordable program area, and discriminating between the non-recorded area and the recorded area according to the reproduced signal throughout the recordable program area;

performing a trial writing operation such as to irradiate the optical beam onto a predetermined area of the optical disk for test recording of data to determine an optimal writing power of the optical beam;

performing the actual recording operation which is either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data; and controlling an actual writing power of the optical beam based on the determined optimal writing power in a different manner between the initial writing operation and the overwriting operation so as to secure the recording of the new data in either of the initial writing operation and the overwriting operation.

4. A method of recording data on a recordable program area of an optical disk by irradiating thereto an optical beam having a writing power effective to write the data in the recordable program area including a non-recorded area which is blank and a recorded area which is recorded with old data, the method comprising:

performing a trial writing operation such as to irradiate the optical beam onto a predetermined area of the optical disk for test recording of data to determine an optimal writing power of the optical beam;

performing an actual recording operation which is either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data; and controlling an actual writing power of the optical beam based on the determined optimal writing power in a different manner between the initial writing operation and the overwriting operation so as to secure the recording of the new data in either of the initial writing operation and the overwriting operation, wherein controlling the actual writing power sets the actual writing power for the overwriting operation greater than the actual writing power for the initial writing operation.

5. An apparatus for recording data on an optical disk by an optical beam, comprising:
- a spindle motor that is provided for rotating the optical disk having a recordable program area including either one or both of a nonrecorded area where data is not yet recorded and a recorded area where old data has been previously recorded;
- an optical pickup that is provided to irradiate the rotated optical disk with the optical beam having a writing power effective to write the data in the recordable area; and
- a controller that controls the spindle motor and the optical pickup to control the recording of data, wherein the controller includes:
  - a trial section that determines an optimal writing power of the optical beam by performing a trial writing operation such as to irradiate the optical beam onto a predetermined area of the optical disk for test recording of data;
  - a selecting section that selects either of an initial writing operation or an overwriting operation for recording of new data on the optical disk, the initial writing operation irradiating the optical beam onto the non-recorded area to initially write the new data, the overwriting operation irradiating the optical beam onto the recorded area to write the new data over the old data; and
  - a setting section that sets based on the determined optimal writing power, an actual writing power of the optical beam for the overwriting operation greater than another actual writing power of the optical beam for the initial writing operation so as to secure the recording of the new data in either of the initial writing operation and the overwriting operation.

6. A computer-readable medium for use in a disk drive apparatus, having a processor, for recording data on a recordable program area of an optical disk by irradiating thereto an optical beam having a writing power effective to write the data in the recordable program area including a non-recorded area which is blank and a recorded area which is recorded with old data, the computer-readable medium having encoded thereon a computer-readable program code which when executed by the processor causes the disk drive apparatus to perform a process comprising:
- scanning the recordable program area of the optical disk prior to an actual recording operation of recording new data prior to the recording of data by irradiating the optical beam so as to reproduce a signal from the recordable program area, and discriminating between the non-recorded area and the recorded area according to the reproduced signal throughout the recordable program area;
- performing either of an initial writing operation or an overwriting operation as the actual recording operation of recording new data on the recordable program area of the optical disk, the initial writing operation irradiating the optical beam onto the non-recorded area to initially write the new data, the overwriting operation irradiating the optical beam onto the recorded area to write the new data over the old data; and
- controlling the writing power of the optical beam between the initial writing operation and the overwriting operation so as to secure the recording of the new data in both the initial writing operation and the overwriting operation.

7. A computer-readable medium for use in a disk drive apparatus, having a processor, for recording data on a recordable program area of an optical disk by irradiating thereto an optical beam having a writing power effective to write the data in the recordable program area including a non-recorded area which is blank and a recorded area which is recorded with old data, the computer-readable medium having encoded thereon a computer-readable program code which when executed by the processor causes the disk drive apparatus to perform a process comprising:
- performing either of an initial writing operation or an overwriting operation as an actual recording operation of recording new data on the recordable program area of the optical disk, the initial writing operation irradiating the optical beam onto the non-recorded area to initially write the new data, the overwriting operation irradiating the optical beam onto the recorded area to write the new data over the old data; and
- controlling the writing power of the optical beam between the initial writing operation and the overwriting operation so as to secure the recording of the new data in both the initial writing operation and the overwriting operation, wherein controlling the writing power sets the writing power for the overwriting operation greater than the writing power for the initial writing operation.

* * * * *